United States Patent
Backfolk et al.

(10) Patent No.: US 11,319,671 B2
(45) Date of Patent: May 3, 2022

(54) PROCESS FOR PRODUCTION OF FILM COMPRISING MICROFIBRILLATED CELLULOSE

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI); Katja Lyytikäinen, Imatra (FI)

(73) Assignee: Stora Enso OYJ, Helsinki (FI)

(*) Notice: Subject to any disclaimer, the term of this patent is extended or adjusted under 35 U.S.C. 154(b) by 0 days.

(21) Appl. No.: 16/080,359

(22) PCT Filed: Mar. 30, 2017

(86) PCT No.: PCT/IB2017/051808
§ 371 (c)(1),
(2) Date: Aug. 28, 2018

(87) PCT Pub. No.: WO2017/168353
PCT Pub. Date: Oct. 5, 2017

(65) Prior Publication Data
US 2019/0024318 A1     Jan. 24, 2019

(30) Foreign Application Priority Data

Apr. 1, 2016    (SE) .................................. 1650437-5

(51) Int. Cl.
*D21H 11/18*     (2006.01)
*D21H 17/68*     (2006.01)
(Continued)

(52) U.S. Cl.
CPC ............. *D21H 11/18* (2013.01); *D21H 17/13* (2013.01); *D21H 17/24* (2013.01); *D21H 17/28* (2013.01);
(Continued)

(58) Field of Classification Search
CPC ...... D21H 11/18; D21H 5/1236; D21H 21/10; D21H 27/38; D21H 17/42; D21H 17/44;
(Continued)

(56) References Cited

U.S. PATENT DOCUMENTS 4,152,199 A * 5/1979 Hamerstrand ......... D21H 17/28
162/164.3
9,605,382 B2    3/2017 Virtanen
(Continued)

FOREIGN PATENT DOCUMENTS

CN      102791924 A    11/2012
JP      2010202987 A    9/2010
(Continued)

OTHER PUBLICATIONS

Martin Hubbe, Mini-Encyclopedia of Papermaking Wet-End Chemistry: Bentonite, Downloaded Sep. 3, 2019, p. 1 (Year: 2019).*
(Continued)

*Primary Examiner* — Eric Hug
*Assistant Examiner* — Elisa H Vera
(74) *Attorney, Agent, or Firm* — Greer, Burns & Crain, Ltd.

(57) ABSTRACT

The present invention relates to a new process for improving dewatering when manufacturing a film comprising high amounts of microfibrillated cellulose (MFC) without negatively impacting the film properties. According to the present invention a high amount of nanoparticles is used as an additive, optionally together with a polymer.

10 Claims, 1 Drawing Sheet

(51) Int. Cl.
*D21H 17/37* (2006.01)
*D21H 17/28* (2006.01)
*D21H 17/55* (2006.01)
*D21H 21/10* (2006.01)
*D21H 27/38* (2006.01)
*D21H 17/44* (2006.01)
*D21H 17/29* (2006.01)
*D21H 21/52* (2006.01)
*D21H 17/24* (2006.01)
*D21H 27/10* (2006.01)
*D21H 17/13* (2006.01)
*D21H 21/50* (2006.01)
*B82Y 30/00* (2011.01)

(52) U.S. Cl.
CPC ........... *D21H 17/29* (2013.01); *D21H 17/375* (2013.01); *D21H 17/44* (2013.01); *D21H 17/55* (2013.01); *D21H 17/68* (2013.01); *D21H 21/10* (2013.01); *D21H 21/50* (2013.01); *D21H 21/52* (2013.01); *D21H 27/10* (2013.01); *D21H 27/38* (2013.01); *B82Y 30/00* (2013.01)

(58) Field of Classification Search
CPC ........ D21H 17/29; D21H 21/52; D21H 17/24; D21H 27/10; D21H 17/13; D21H 21/50; D21H 17/375; D21H 17/28; D21H 17/55; D21H 17/68; B82Y 30/00
See application file for complete search history.

(56) References Cited

U.S. PATENT DOCUMENTS

| | | | |
|---|---|---|---|
| 2012/0132381 A1 | 5/2012 | Hentze et al. | |
| 2012/0216718 A1 | 8/2012 | Berglund et al. | |
| 2012/0291974 A1 | 11/2012 | Kajanto | |
| 2013/0186584 A1* | 7/2013 | Krapsch | D21H 17/28 162/161 |
| 2013/0020977 A1 | 8/2013 | Sandström et al. | |
| 2013/0209772 A1* | 8/2013 | Sandstrom | D21H 11/18 428/220 |
| 2014/0154937 A1 | 6/2014 | Desbois et al. | |
| 2014/0302336 A1 | 10/2014 | Heiskanen et al. | |
| 2015/0315747 A1 | 11/2015 | Heiskanen et al. | |

FOREIGN PATENT DOCUMENTS

| | | |
|---|---|---|
| JP | 2012007247 A | 1/2012 |
| WO | 2011055017 | 5/2011 |
| WO | 2012107642 | 8/2012 |
| WO | 2013060934 | 5/2013 |
| WO | 2014033409 | 3/2014 |
| WO | 2014154937 | 10/2014 |
| WO | 2014154937 A1 | 10/2014 |
| WO | 2016185397 A1 | 11/2016 |

OTHER PUBLICATIONS

International Searching Authority, Written Opinion of the International Searching Authority, PCT/IB2017/051808, dated Oct. 5, 2017.

International Searching Authority, International Search Report, PCT/IB2017/051808, Oct. 5, 2017.

Krol, Lieie Ferreria, et al., "Microfibrillated Cellulose-SiO2 Composite Nanopapers Produced by Spray Deposition," J. Water Sci., (2015) vol. 50, pp. 4095-4103.

Chinga-Carrasco, G., "Cellulose Fibres, Nanofibrils and Microfibrils: The Morphological Sequence of MFC Components from a Plant Physiology and Fibre Technology Point of View," Nanoscale Research Letters 2011.

Fengel, D., "Ultrastructural Behavior of Cell Wall Polysaccharides," Tappi J., Mar. 1970, vol. 53, No. 3.

\* cited by examiner

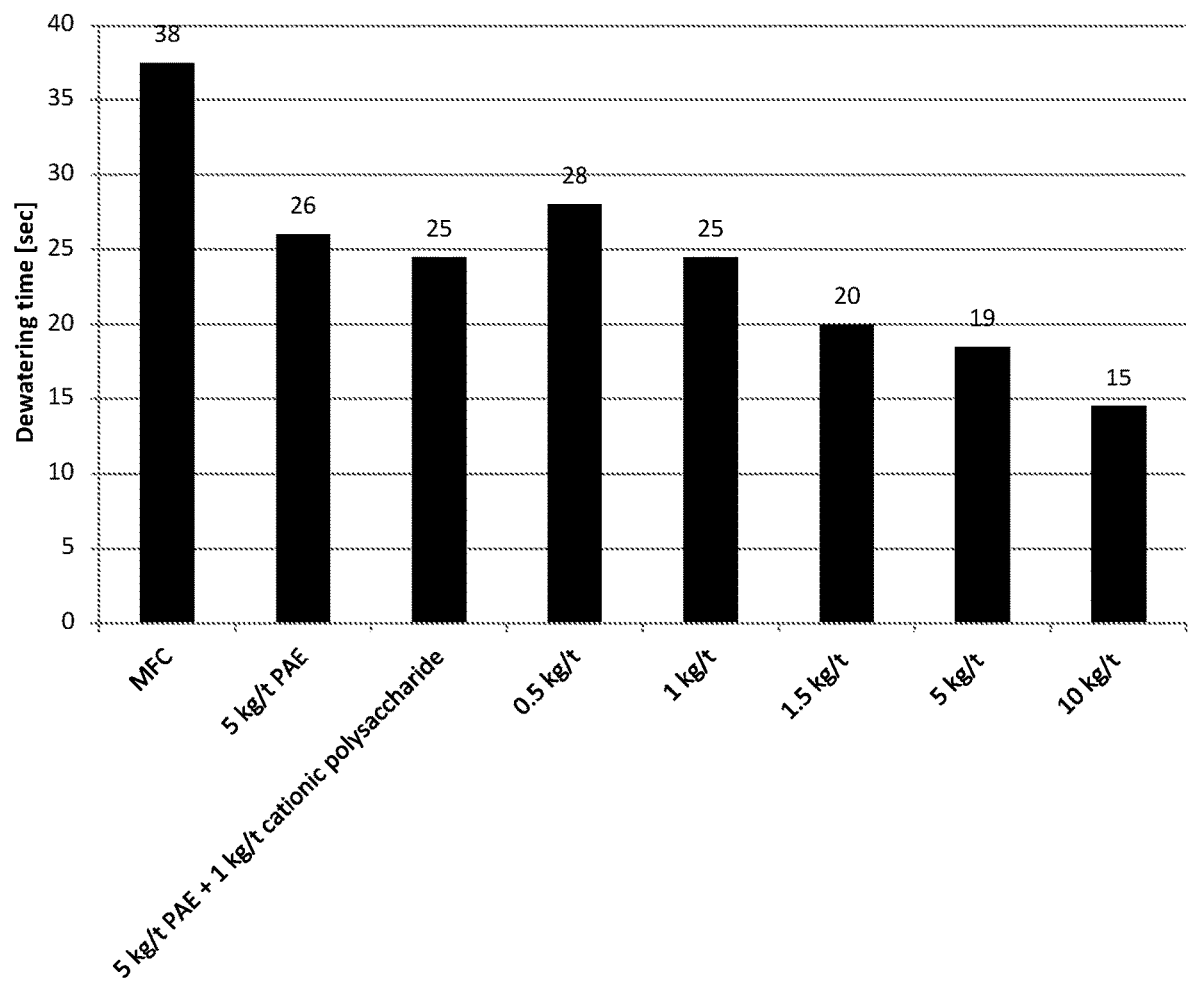

PROCESS FOR PRODUCTION OF FILM COMPRISING MICROFIBRILLATED CELLULOSE

This application is a U.S. National Phase under 35 U.S.C. § 371 of International Application No. PCT/IB2017/051808, filed Mar. 30, 2017, which claims priority under 35 U.S.C. §§ 119 and 365 to Swedish Application No. 1650437-5, filed Apr. 1, 2016.

TECHNICAL FIELD

The present invention relates to a new process for improving dewatering when manufacturing a film comprising high amounts of microfibrillated cellulose (MFC) without negatively impacting the film properties. According to the present invention a high amount of nanoparticles is used as an additive, optionally together with a polymer.

BACKGROUND

The manufacturing of a film from a web comprising microfibrillated cellulose (MFC) on a paper machine or similar wet laid technique at high speeds is very demanding. Due to a low dewatering speed, which is related to MFC fineness, charge and quantity, there are problems when releasing the material from the wire of the paper machine. One solution would be to reduce machine speeds, but then the production of the film is not economically attractive. Thus, at higher speeds stronger dewatering is required which hence results in the above problem. There is also a risk that a too strong dewatering may cause pin-holes in the web, which deteriorates the quality of the film. Another critical variable is the formation of the web, which in turn affects the web properties.

It is known that MFC films or webs comprising high amounts of MFC are difficult to dewater. Various solutions have been tested such as different retention chemicals, polymers, self-healing solutions, long fibers, etc. Typically, the cationic demand or charge of papermaking fiber suspensions in a wet end is close to zero which hence facilitate particle and fiber flocculation. Thus, charge regulation such as ionic neutralization or polymer bridging assist in traditional fiber flocculation and dewatering and retention, respectively. The use of retention chemicals based on nanoparticles has been tested to some extent, particularly in conventional papermaking which hence aims towards charge and inter-particle control. Silica nanoparticles, for example, are combined with cationic chemicals (polymers) typically in a ratio of 1:2 (polymer:silica) and nanoparticle doses in normal papermaking is about ca 100-400 g/ton. An overdose of retention chemicals in papermaking would lead to increased porosity, uneven and stronger flocculation, two-sideness, problem with dimensional stability and subsequently uneven product quality.

Various manufacturing methods have been proposed to make MFC or NFC films such as free standing films by coating NFC on plastic support material like PE, PET, and so on (WO2013060934A2). In many cases, the dewatering is limited to evaporation and/or contact drying which influences both film quality and manufacturing rate.

WO2012107642A1 addresses the problem with the hygroscopic properties of MFC, which was solved by using organic solvent when preparing the films.

WO2014154937 A1 relates to a method for production of paper or board comprising providing a stock comprising cellulose fibers, adding a mixture comprising microfibrillated cellulose and a strength additive to the stock, adding a microparticle to the stock after the addition of said mixture, dewatering the stock on a wire to form a web, and drying the web.

WO2011055017 A1 relates to a process for the preparation of paper or board comprising: adding a retention system to a stream of stock entering a paper machine head box, directing the stream of stock to a wire, dewatering the stream of stock on the wire to form a paper web, and drying the paper web, wherein the retention system comprises a water-soluble cationic polymer, and nanocellulose acting like a micro particle, wherein the nanocellulose is added in an amount of less than 1% as active substance based on dry solids weight of the stock.

There is a need for a method and a composition where the dewatering rate can be significantly improved when forming a film from a wet web comprising high amounts of microfibrillated cellulose. More preferably, the solution should improve both the rate of dewatering and e.g. barrier properties of the film, which usually are contradicting properties.

SUMMARY

It is an object of the present disclosure to provide an improved method of manufacturing a film comprising microfibrillated cellulose, which eliminates or alleviates at least some of the disadvantages of the prior art methods.

It has surprisingly been found that by using certain amounts of nanoparticles, particularly anionic nanoparticles, the dewatering is much faster but the barrier properties remain very good.

According to a first aspect, there is provided a process for the production of a film comprising the steps of:
a) providing a suspension comprising microfibrillated cellulose, wherein the content of the microfibrillated cellulose of said suspension is at least 60 weight-% based on the weight of solids of the suspension;
b) adding nanoparticles to said suspension to provide a mixture of said microfibrillated cellulose and said nanoparticles, wherein the amount of nanoparticles added is at least 1.0 kg on dry basis per ton of dry solids of the suspension;
c) providing said mixture to a porous wire to form a web; and
d) dewatering said web to form an intermediate thin substrate or film.

In one embodiment, the process is carried out in a paper making machine.

The nanoparticles can be e.g. silica or modified silica or silicates, alumina, nanoclays such as montmorillonite or bentonite, nanobentonite, nanolatex, nanostarch, etc. In one embodiment of the present invention, the nanoparticles are silica or nanosilica. In one embodiment of the invention, the nanoparticles are anionic. In one embodiment of the invention, said silica or nanosilica is anionic at neutral or alkaline pH. In one embodiment of the present invention, the nanoparticles are amphoteric at neutral or alkaline pH. In one embodiment of the present invention, the nanoparticles are non-ionic. The nanoparticles used according to the present invention typically have an individual diameter of from 1 to 100 nm, but can form clusters which are thus larger aggregates of nanoparticles.

The amount of nanoparticles added is at least 1.0 kg/ton, such as 1.0-50 kg/ton, 1.0-30 kg/ton, 1.5-20 kg/ton 1.5-10 kg/ton, 2-10 kg/ton or 4-10 kg/ton (on dry basis per ton of dry solids of the suspension).

In one embodiment of the present invention, a specific ratio of retention polymer to nanoparticle is used. The ratio (by weight) depends on the charge and molecular weight of the retention polymer used, but is typically from about 1:3 to about 1:20, such as from about 1:5 to 1:12 or 1:8 to 1:10.

Said retention polymer is preferably a cationic polymer such as cationic starch, polyaminoamide-epichlorohydrin (PAE), polyamidoamine (PAMAM), cationic polyacryl amide or copolymer thereof (C-PAM), polyethylene oxide (PEO) or other copolymers thereof or polymers typically used in retention/drainage studies. Examples of such polymers are cationic polyvinyl amine (PVAm), cationic polydiallyldimethylammonium chloride (PDADMAC), polyethylene imine (PEI), dicyandiamide formaldehyde (DCD), cationic polyvinylalcohol (C-PVA), cationic protein, etc. Further examples of polymers are any copolymer of acrylamide and/or methacrylamide, prepared using at least as one of the comonomers a cationically charged or cationically chargeable monomer. Such monomers include methacryloyloxyethyltrimethyl ammonium chloride, acryloyloxyethyltrimethyl ammonium chloride, 3-(methacrylamido)propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylaminopropylacrylamide, dimethylaminopropylmethacrylamide, or a similar monomer. The polymer may also contain monomers other than acrylamide, methacrylamide, or some cationic or cationizable monomer.

The nanoparticles can be dosed in various ways although it is most preferable to dose the nanoparticles after the retention polymers. One option is to use an in-line mixing system to make mixing more efficient. In one embodiment of the present invention, the nanoparticles are added to the microfibrillated cellulose in the manufacturing phase of MFC from pulp.

In one embodiment of the present invention, the microfibrillated cellulose may have a Schopper Riegler value (SR°) of more than 85 SR°, or more than 90 SR°, or more than 92 SR°. The Schopper-Riegler value can be determined through the standard method defined in EN ISO 5267-1.

The basis weight of the obtained film is preferably <35 g/m$^2$, more preferably <30 g/m$^2$ and most preferably <25 g/m$^2$.

According to a further embodiment of the present invention, there is provided a laminate comprising a film prepared according to the present invention and a thermoplastic polymer coating, such as any one of a polyethylene, EVOH, starch, styrene/butadiene, styrene/acrylate, polypropylene, a polyethylene terephthalate and a polylactic acid. The coating can be provided e.g. by extrusion coating, film coating or dispersion coating. This laminate structure may provide for even more superior barrier properties. In one embodiment, the MFC film can be present between to coating layers, such as between two layers of polyethylene, with or without a tie layer. According to one embodiment of the present invention, the polyethylene may be any one of a high density polyethylene and a low density polyethylene or mixtures or modifications thereof that could readily be selected by a skilled person. According to further embodiment there is provided the film or the laminate according to present invention, wherein said film or said laminate is applied to the surface of any one of a paper product and a board. The film or laminate can also be part of a flexible packaging material, such as a free standing pouch.

The intermediate thin substrate is an intermediate product which has not yet been processed into the final film having the characteristic OTR values, but may processed into such a film in a later converting process.

One embodiment of the present invention is a film produced according to the process of the present invention. The film is a thin sheet, mouldable film or web. It comprises a high amount of microfibrillated cellulose and can be laminated to form a multilayered structure. The film may be transparent or translucent. The OTR (oxygen transmission rate) value (measured at standard conditions) of the film is <200 cc/m2*day measured at 50% RH, 23° C., preferably <30, more preferably <15 and most preferably <10 (i.e. before further treatment such as PE lamination) at a grammage of 10-50 gsm. The thickness of the film can be selected dependent on the required properties. Film thickness may for example be 10-100 μm, such as 20-50 or 30-40 μm, having a grammage of for example 10-50 gsm, such as 20-30 gsm. The film has good barrier properties (e.g. to gas, aroma, light etc).

A further embodiment of the present invention is a product comprising the film produced according to the process of the present invention.

One embodiment of the present invention is a flexible package produced according to the process of the present invention. A further embodiment of the invention is a rigid package comprising a film produced according to the present invention.

BRIEF DESCRIPTION OF THE FIGURES

FIG. 1: The effect of silica on dewatering rates of 30 GSM films prepared of MFC using a vacuum sheet mold. All test points with silica also include 5 kg/t PAE and 1 kg/t cationic polysaccharide.

DETAILED DESCRIPTION

In one embodiment of the present invention, a film is formed in a paper making machine or according to a wet laid production method, by providing a suspension onto a wire and dewatering the web to form an intermediate thin substrate or said film. According to one embodiment, a suspension comprising microfibrillated cellulose is provided to form said film.

The microfibrillated cellulose content of the suspension may, according to one embodiment be in the range of from 60 to 99.9 weight-% based on the weight of solids of the suspension. In one embodiment, the microfibrillated cellulose content of the suspension may be in the range of 70 to 99 weight-%, in the range of 70 to 95 weight-%, or in the range of from 75 to 90 weight-%.

In one embodiment of the present invention, enhanced dewatering effect of MFC suspension in wet laid production method is achieved by dosing anionic nanoparticles in an early stage of the manufacturing process, not as part of the short circulation retention system in the machine used.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant*

*physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc.

The papermaking machine that may be used in the process according to the present invention may be any conventional type of machine known to the skilled person used for the production of paper, paperboard, tissue or similar products.

Subsequent to the wet web being placed onto the wire, it is dewatered to form an intermediate thin substrate or film.

The dewatering on wire may, according to one embodiment be performed by using known techniques with single wire or twin wire system, frictionless dewatering, membrane-assisted dewatering, vacuum- or ultrasound assisted dewatering, etc. After the wire section, the wet web is further dewatered and dried by mechanical pressing including shoe press, hot air, radiation drying, convection drying, etc. The film might also be dried or smoothened by soft or hard nip (or various combinations) calenders etc.

According to one embodiment the wet web is dewatered by vacuum, i.e. water, and other liquids, is sucked from the furnish when it is placed on the wire.

According to one embodiment, the film comprising the microfibrillated cellulose and nanoparticles may be laminated to or with a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

The film or the laminate may also be applied to other paper products, such as food containers, paper sheets, paper boards or boards or other structures that need to be protected by a barrier film.

EXAMPLES

Example 1

A sheet mold equipped with a vacuum pump and commercial SSB wire was used to screen some additives that could be used to enhance the dewatering of MFC suspensions.

Colloidal silica (EKA NP 200) was tested as dewatering agent. In the system containing 5 kg/t PAE (Kymene X-Cel 25) and 1 kg/t cationic polysaccharide with microfibrillated cellulose, silica was found to be very efficient in improving the dewatering of MFC suspension, see FIG. 1. However, unusually high doses (>1.5 kg/t) of silica were required to achieve improvement in dewatering. Dewatering time of 30 gsm MFC film was reduced from 38 seconds (MFC suspension without any chemicals) to 25 seconds with addition of 5 kg/t PAE (Kymene X-Cel 25) and 1 kg/t cationic polysaccharide, and further decreased to 20, 19, or 15 seconds with 1.5, 5.0, or 10.0 kg/t silica (EKA NP 200) addition.

Example 2

Bentonite (Hydrocol SH), silica (EKA NP) and nanobentonite (RXW) were used as fluidization (Microfluidizer MH-110 device) additives with dosage levels of 1 wt-% and 5 wt-%. The pulp and the chemicals where placed into the laboratory wet-disintegrator which was operated for 10000 revs. After disintegration, the pulp/chemical mixture was processed to MFC with Microfluidizer device.

Films were prepared of the fibrillated products in presence of 5 kg/t PAE (Kymene X-Cel 25) and 1 kg/t cationic polysaccharide and it was found that when the suspensions contained 1% (i.e. 10 kg/t) bentonite or silica the dewatering time for 30 gsm MFC films was reduced from approximately 150 seconds to approximately 100 seconds. With the suspension containing 5% (i.e. 50 kg/t) bentonite the dewatering rate was hindered. Nanobentonite provided 10-15% decrease in dewatering time with 1% and 5% dose (i.e. 10 kg/t and 50 kg/t). The dewatering times and film properties are given in Table 1. Surprisingly, in spite of the relatively large content of micro- or nanoparticles (bentonite, silica or nanobentonite) in the films (10 or 50 kg/t) the oxygen barrier properties were remained at an initial level (value 7.9 cc/$m^2$/day for Ref.) except for the sample containing 5% nanobentonite showing an increased OTR.

Thus, it was found that when introducing micro- or nanoparticles such as silica, bentonite and nanobentonite into the system prior to fibrillation of the pulp to MFC, the dewatering properties of MFC suspensions can be enhanced. Surprisingly high dosages, even up to 50 kg/t, can be used without negative effect on the oxygen barrier properties of the MFC film.

TABLE 1 the effect of nano- and microparticles on dewatering and properties of 30 gsm films prepared in presence of 5 kg/t PAE and 1 kg/t cationic polysaccharide. Fibrillation of Imatra pretreated pulp was done in presence ot particles. OTR (*) was determined for 20 GSM films at 50% RH and 23° C. temperature.

|  | Dewatering time, sec | Density, kg/$m^3$ | Basis weight, g/$m^2$ | Tensile index, Nm/g |
|---|---|---|---|---|
| Ref. | 152 | 940 | 29.9 | 103 |
| Bentonite, 1% | 104 | 931 | 30.4 | 97 |
| Bentonite, 5% | 146 | 915 | 30.2 | 91 |
| Silica, 1% | 96 | 936 | 30.9 | 98 |
| Silica, 5% | 110 | 907 | 30.8 | 88 |
| Nanobentonite, 1% | 133 | 931 | 30.5 | 99 |
| Nanobentonite, 5% | 129 | 910 | 31.5 | 90 |

|  | Stretch, % | Elastic modulus, Mpa | Tensile stiffness index, MNm/kg | TEA index, J/kg | OTR, cc/($m^2$-day)* |
|---|---|---|---|---|---|
| Ref. | 3.8 | 8486 | 2.7 | 2854 | 7.9 |
| Bentonite, 1% | 3.4 | 8417 | 2.9 | 2356 | 8.7 |
| Bentonite, 5% | 2.9 | 8798 | 3.1 | 1946 | 8.3 |
| Silica, 1% | 3.4 | 8828 | 2.9 | 2425 | 7.6 |
| Silica, 5% | 3.1 | 7730 | 2.8 | 2079 | 8.6 |
| Nanobentonite, 1% | 3.5 | 8626 | 2.9 | 2475 | 8.4 |
| Nanobentonite, 5% | 3.5 | 7802 | 2.6 | 2261 | 40.4 19.5 |

Example 3

The aim of this trial was to clarify the effect of silica dosage on MFC web dewatering and runnability as well as on resulting product properties, especially barrier properties. The retention system comprised of 4 kg/t wet end starch (Raisamyl 50021), 1.5 kg/t AKD (Aquapel A221), 1 kg/t cationic polysaccharide, 5 kg/t PAE (Kymene X-Cel 25), The tested silica dosages were 0.9, 2.0, 5.0 and 10 kg/t.

The increased silica dosages were found to be beneficial for the web dewatering as expected (see Table 2). With 0.9 kg/t silica dose the water line was 2/2 which was then quite linearly changed closer to the headbox (i.e. improved dewatering) down to 1/3 with the highest silica addition (10 kg/t). With respect to retention, a clear maximum of 98.8% was observed with 2 kg/t silica dose while with all other silica levels the retention was 91.4% or less. Therefore, silica with relatively high dosages can be used to enhance the dewatering of MFC webs in continuous production. Furthermore, the oxygen barrier properties can be preserved in spite of the surprisingly high dosage of silica especially.

The oxygen transmission rates (OTR) showed a clear minimum with the silica dosage of 5 kg/t where OTR was around 10 cc/($m^2$-day).

TABLE 2 wet end conditions and properties of resulting film products in pilot paper machine trials. Water line: the first number is the vacuum box number, the second number is where the water line is in the vacuum box (for example 1/5 means that the water line is in the first vacuum box, in the last part of the vacuum box)

|  | P3/1 | P3/2 | P3/3 | P3/4 |
|---|---|---|---|---|
| Fiber source | MFC | MFC | MFC | MFC |
| Wet end starch, kg/t | 4 | 4 | 4 | 4 |
| Silica, kg/t (dosed amount) | 0.9 | 2 | 5 | 10 |
| PAE, kg/t | 5 | 5 | 5 | 5 |
| Other additives, kg/t | AKD 1.5 cationic polysaccharide | AKD 1.5 cationic polysaccharide | AKD 1.5 cationic polysaccharide | AKD 1.5 cationic polysaccharide |
| O-water temp., ° C. | 70 | 70 | 70 | 70 |
| Machine speed, m/min | 15 | 15 | 15 | 15 |
| Water line (suction boxes) | 2/2 | 2/1 | 1/5 | 1/3 |
| Wire retention, % | 83.11 | 98.82 | 91.38 | 90.42 |
| Headbox consistency, % | 0.267 | 0.254 | 0.290 | 0.261 |
| pH | 8.2 | 8.1 | 8.0 | 7.9 |
| OTR, cc/($m^2$-day) 50% RH and 23° C. | 44.9 | 41.3 | 9.1 | 176 |
| Silica, kg/t (measured amount) |  | 1.1 | 2.9 | 4.9 |

In view of the above detailed description of the present invention, other modifications and variations will become apparent to those skilled in the art. However, it should be apparent that such other modifications and variations may be effected without departing from the spirit and scope of the invention.

The invention claimed is:

1. A process for the production of a film comprising the steps of:
   a. providing a suspension comprising microfibrillated cellulose, wherein the content of the microfibrillated cellulose of said suspension is at least 60 weight-% based on the weight of solids of the suspension;
   b. adding cationic polymer to said suspension, wherein said cationic polymer is selected from a group consisting of: cationic starch, polyaminoamide-epichlorohydrin (PAE), and copolymers thereof;
c. adding nanoparticles to said suspension to provide a mixture of said microfibrillated cellulose, cationic polymer, and said nanoparticles and said cationic polymer, wherein said nanoparticles are anionic at neutral or alkaline pH, and wherein an amount of nanoparticles added is between 1.0 to 30 kg on dry basis per ton of dry solids of the suspension, and wherein the weight ratio of cationic polymer to anionic nanoparticles is in the range of from 1:3 to 1:20, wherein said nanoparticles are nanosilicate or nanobentonite particles;
d. providing said mixture to a porous wire to form a web; and
e. dewatering said web to form an intermediate thin substrate or film having an OTR value, at 50% RH and 23 ° C., between 200 and 7.

2. The process according to claim 1, wherein the weight ratio of cationic polymer to anionic nanoparticles is in the range 1:5 to 1:12.

3. A process for the production of a film comprising the steps of:
a. providing a first mixture comprising pulp and nanoparticles;
b. fibrillating said first mixture to form a second mixture comprising microfibrillated cellulose, nanoparticles, and a cationic polymer,
wherein the content of the microfibrillated cellulose of said second mixture is at least 60 weight-% based on the weight of solids of the second mixture,
wherein an amount of nanoparticles added is between 1.0 to 30 kg on dry basis per ton of dry solids of the second mixture,
wherein said nanoparticles are nanosilicate or nanobentonite particles,
wherein a weight ratio of cationic polymer to nanoparticles is in a range between 1:3 to 1:20, and
wherein said cationic polymer is selected from a group consisting of: cationic starch, polyaminoamide-epichlorohydrin (PAE) and copolymers thereof;
c. providing said second mixture to a porous wire to form a web; and
d. dewatering said web to form an intermediate thin substrate or film having an OTR value, at 50% RH and 23° C., between 200 and 7.

4. The process of claim 3, wherein said nanoparticles are anionic nanoparticles.

5. The process of claim 1, wherein the OTR value, at 50% RH and 23° C. is between 30 and about 7.

6. The process of claim 1, wherein the OTR value, at 50% RH and 23° C. is between 15 and about 7.

7. The process of claim 1, wherein the OTR value, at 50% RH and 23° C. is between 10 and about 7.

8. The process of claim 3, wherein the OTR value, at 50% RH and 23° C. is between 30 and about 7.

9. The process of claim 3, wherein the OTR value, at 50% RH and 23° C. is between 15 and about 7.

10. The process of claim 3, wherein the OTR value, at 50% RH and 23° C. is between 10 and about 7.

* * * * *